(12) United States Patent
Bridges et al.

(10) Patent No.: US 10,715,409 B2
(45) Date of Patent: Jul. 14, 2020

(54) HEURISTICS FOR END TO END DIGITAL COMMUNICATION PERFORMANCE MEASUREMENT

(71) Applicant: Microsoft Technology Licensing, LLC, Redmond, WA (US)

(72) Inventors: Gareth L. Bridges, Redmond, WA (US); Amer A. Hassan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 38 days.

(21) Appl. No.: 16/020,689

(22) Filed: Jun. 27, 2018

(65) Prior Publication Data

US 2020/0007421 A1 Jan. 2, 2020

(51) Int. Cl.
*H04L 12/26* (2006.01)
*H04L 12/841* (2013.01)
*H04M 7/00* (2006.01)

(52) U.S. Cl.
CPC ............ *H04L 43/08* (2013.01); *H04L 47/283* (2013.01); *H04M 7/006* (2013.01)

(58) Field of Classification Search
None
See application file for complete search history.

(56) References Cited

U.S. PATENT DOCUMENTS

| | | | | |
|---|---|---|---|---|
| 6,912,203 B1* | 6/2005 | Jain | ...................... | H04L 43/0858 370/241 |
| 8,155,026 B2* | 4/2012 | Campbell | ........... | H04L 43/0852 370/253 |
| 9,392,471 B1* | 7/2016 | Thomas | ............ | H04W 36/0083 |
| 9,655,129 B2* | 5/2017 | Linden | .................. | H04L 1/1621 |
| 2002/0194361 A1* | 12/2002 | Itoh | ....................... | H04L 1/0002 709/233 |
| 2006/0274760 A1* | 12/2006 | Loher | ................. | H04M 3/2236 370/395.52 |
| 2007/0280127 A1 | 12/2007 | Connor et al. | | |

(Continued)

OTHER PUBLICATIONS

"International Search Report and Written Opinion Issued in PCT Application No. PCT/US19/037568", dated Sep. 30, 2019, 13 Pages.

*Primary Examiner* — Jeffrey M Rutkowski
*Assistant Examiner* — Andre Tacdiran
(74) *Attorney, Agent, or Firm* — Schwegman Lundberg & Woessner, P.A.

(57) ABSTRACT

Methods and systems for determining whether to adjust a network path between two endpoints of a network connection or session are disclosed. In some aspects, a method includes receiving a performance indication for a first portion of a network path for a network connection, the first portion between a first node and a second node in the network path, receiving an indication of a geographic location of a third node in the network path, the indication included in a message from the second node, a path between the second node and the third node comprising a second portion of the network path, the second portion not including the first portion, generating a performance measurement for the network connection based on the performance indication and the indication of the geographic location of the third node and initiating an adjustment of the network connection based on the performance measurement.

17 Claims, 9 Drawing Sheets

(56) References Cited

U.S. PATENT DOCUMENTS

| | | | |
|---|---|---|---|
| 2008/0025320 A1* | 1/2008 | Bangalore | H04L 65/1069 370/395.52 |
| 2010/0079277 A1* | 4/2010 | Farah | H04L 67/18 340/539.13 |
| 2013/0079027 A1* | 3/2013 | Hand | H04W 24/00 455/456.1 |
| 2014/0115186 A1* | 4/2014 | Weston | H04L 69/163 709/235 |
| 2014/0198670 A1* | 7/2014 | Mahasenan | H04W 24/00 370/252 |
| 2014/0219255 A1* | 8/2014 | Eyuboglu | H04W 72/12 370/336 |
| 2014/0280898 A1* | 9/2014 | Voit | H04W 4/029 709/224 |
| 2015/0016294 A1* | 1/2015 | Hegge | H04L 47/41 370/252 |
| 2017/0142014 A1* | 5/2017 | Vincent | H04L 47/17 |
| 2017/0237851 A1 | 8/2017 | Hassan et al. | |
| 2017/0359145 A1* | 12/2017 | Downey | H04L 1/0009 |
| 2019/0274065 A1* | 9/2019 | Zhao | H04W 24/10 |

* cited by examiner

HEURISTICS FOR END TO END DIGITAL COMMUNICATION PERFORMANCE MEASUREMENT

BACKGROUND

Digital communications between two end points may be facilitated via the use of multiple independent networks in some cases. For example, a first network, maintained by a first network provider, may provide digital network services within a first geographic region. Outside the first geographic region, the first network provider may have less established or no infrastructure. Thus, digital communication initiated by a first endpoint within the first geographic region may utilize both the first network and a second network to reach a second endpoint located in a different second geographic region. In some cases, digital communication may utilize any number of different networks to communicate data from the first endpoint of the call to the second endpoint of the call.

Data exchange between these different networks may be limited. For example, performance metrics and other diagnostic information for a first network may not be readily available from a second of the networks. Thus, obtaining end-to-end performance and diagnostic information may be difficult, resulting in increased troubleshooting burden and possible false alarms. Therefore, improved methods of exchanging performance relevant information between networks are desired.

The approaches described in this background section are approaches that could be pursued, but not necessarily approaches that have been previously conceived or pursued. Therefore, unless otherwise indicated, it should not be assumed that any of the approaches described in this background section qualify as prior art merely by virtue of their inclusion in this background section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
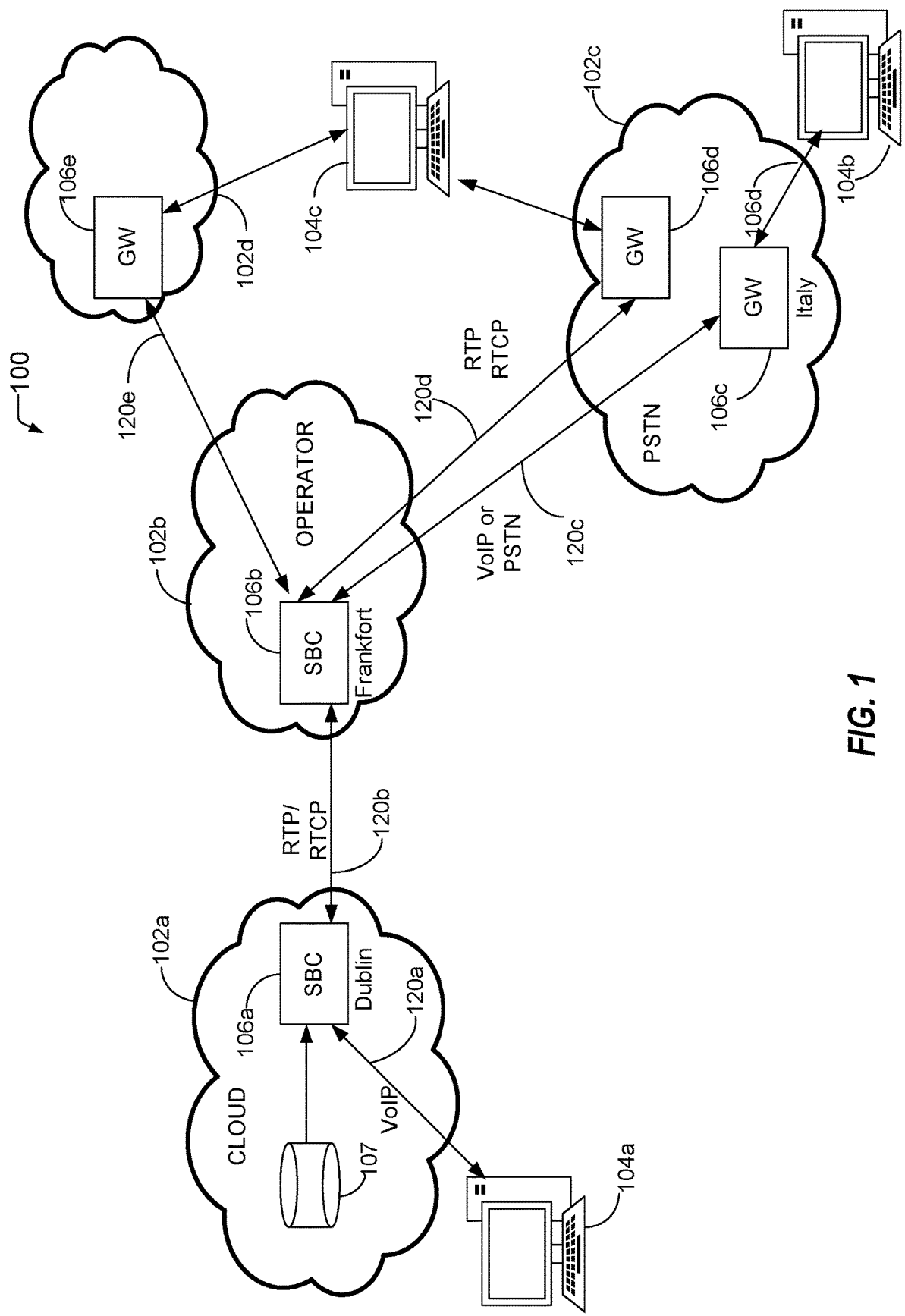
FIG. 1 is an overview diagram of a communication network.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, in some digital communication networks, performance data may be available for only a portion of a network path supporting a network session. For example, a communication network may support Voice over Internet Protocol (VoW) sessions between endpoints. Two endpoints may communicate via a network path through the communication network, that may utilize two or more network nodes, which may include routers, switches, gateways, session border controllers, or other network equipment. These network nodes may be connected via disparate network technologies, such as local area networks, satellite connections, fiber optic technologies, or other digital networking technologies. Thus, multiple portions of the network path may experience different levels of performance based on the underlying technology used for the respective portion. In addition, different portions of a network path may be experiencing different levels of load or congestion. These different levels of load or congestion may also affect a resulting performance of the respective portion of the network path. Furthermore, some endpoints may be located in particular regions that may be known for relatively slower or faster network connectivity, and or lower level of reliability in some aspects. For example, remote locations not near an urban center may have fewer redundant network paths to the location, and thus may be subject to higher levels of network outages due to the reduced level of redundancy when compared to other locations.

Thus, the disparate network conditions described above present a technical problem with determining a root cause of network performance experienced by an endpoint. The disclosed embodiments present a variety of technical solutions to this technical problem. For example, in some cases, some geographic locations may be identified by the disclosed embodiments, and may be treated differently when performance problems are experienced with network connections or sessions involving these geographic locations. For example, a longer period of below nominal performance may be tolerated with sessions terminating at these identified geographic locations. In some other aspects, network path information may be communicated by multiple network nodes in a network path, such that the network nodes in the network path may better understand network conditions along the network path, and may take action appropriate for specific conditions associated with the network path.

For example, less than nominal network performance may be an unusual event when two endpoints (first and second) are located with two well connected geographic locations. Thus, if performance drops below a defined level, it may be appropriate to adjust the network path between the two endpoints to take advantage of possible redundant paths between the two endpoints. Another (third) endpoint may be located in a relatively remote location, with a reputation for unreliable or relatively slow performance. A network session established with this third endpoint may be prone to various performance issues, such as disconnections, slow response times, and other associated performance issues. In this case, a different approach may be appropriate when compared to the approach taken with the first endpoint. For example, in some aspects, performance below a nominal level may be tolerated for a longer period of time for network sessions with this endpoint, as attempting to switch the network session to a different network path may be less likely to succeed, and the performance may be expected to return to a nominal level after a period of time.

FIG. 1 is an overview diagram of a communication network. The communication network 100 includes a first network 102a, second network 102b, third network 102c, and a fourth network 102d. Each of the first, second, third, and fourth networks 102a-d may be maintained by different entities, such as different corporations. In some aspects, one or more of the networks 102a-d may be maintained by a single entity. The networks 102a and 102b include session border controllers 106a and 106b respectively. The session border controllers 106a-b may provide for control and/or signaling of Voice over Internet Protocol (VoW) communications. The session border controllers 106a-b may also manage media streams with respect to setting up, conducting, and tearing down telephone calls or other interactive media communications. A real-time transport protocol (RTP) communication session may be provided between the two session border controllers 106a and 106b. Voice over IP (VoIP) data may be transmitted between the two session border controllers 106a-b via the one or more RTP communication session(s). The session border controllers 106a-b may also communicate control information regarding voice over IP sessions using the real-time transmission control protocol (RTCP). RTCP may provide, for example, information on session performance experienced by the RTP sessions between the session border controllers 106a-b. For example, RTCP may provide quality of service statistics, such as round-trip times or delays between the session border controllers 106a and 106b.

FIG. 1 also shows two end point devices 104a and 104b. In some aspects, the communications network 100 may provide for a communication session between the two end point devices 104a and 104b. For example, the communications session may utilize each of the networks 102a-c to pass data between the two end point devices 104a-b. As shown in FIG. 1, the network 102c may be a public switched telephone network (PSTN) in some aspects.

Alternatively, the network 102c could be a digital communications network in some other aspects. The communications session between the two end point devices 104a and 104b may utilize a gateway device 106c to provide communication with the endpoint 104b. The endpoint 104a may also establish a separate communications session with an endpoint 104c using a different gateway device 106d. The endpoint 104a, devices 106a, 106b, and 106c, and endpoint 104b may be connected via links 120a, 120b, 120c and 120d.

Because a communications session between the two endpoints 104a and 104b or 104a and 104c traverse various networks, the communication session's performance may be subject to various conditions occurring on each of those networks. For example, a latency between the two SBCs 106a and 106b may be nominal (e.g., meet one or more predefined criterion), while a second latency between the SBC 106b and gateway 106c may be substantially above a nominal value during particular time periods. In this situation, a performance metric provided by a RTCP connection between the two SBCs 106a and 106b may report that, for example, round trip times between the two SBCs 106a and 106b are within a nominal range. However, the user at the endpoint 104a may be experiencing less than nominal performance (e.g., performance less than a defined threshold or a performance meeting one or more criterion). Thus, aspects of this disclosure may provide for improved visibility to performance of a communications session that spans several communications networks, such as those illustrated in the communications network 100 illustrated with respect to FIG. 1. By improving the visibility of network characteristics that may affect performance of a communications session across several different communications networks, user satisfaction may be improved, by better informing users for reasons of any less than nominal communications performance they may experience. Additionally, in some aspects, changes in how a communications session is routed over multiple networks may be made based on information collected on the performance of the various components of a communications path. For example, in an environment where the network 102c may be experiencing delays, the disclosed embodiments may modify a route taken by the communications session between the two end points 104a and 104c such that the route utilizes network 102d instead of 102c to communicate with the end point 104c.

Figure 2:
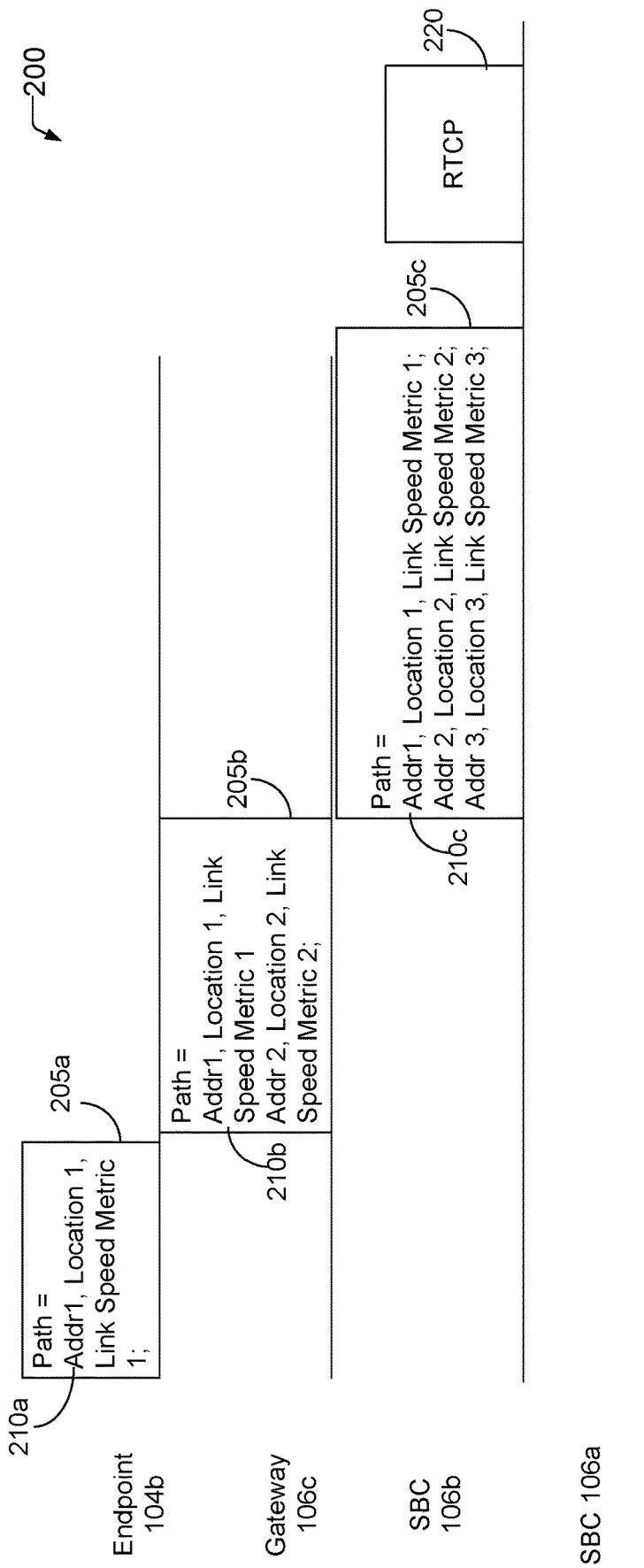
FIG. 2 illustrates a message exchange between devices within the communication network of FIG. 1.

FIG. 2 illustrates a message exchange between devices within the communication network 100 of FIG. 1. FIG. 2 shows a first message 205a that may be transmitted from the endpoint 104b to the gateway 106c. The message 205a may be a SIP message in some aspects. The message includes a network path indication 210a. In some aspects, the network path indication 210a may be included in a SIP header of the message 205a when the message 205a is a SIP message. The path indication 210a includes an address of the endpoint 104b a geographic location of the endpoint 104b, and a link speed metric "1". The address may be, for example, an Internet Protocol (IP) address, or other address, such as a station address. The geographic location may be in the form of geodetic coordinates, or other format that identifies a geographic location of the endpoint 104b, at least to some level of accuracy. For example, the geographic location may identify a city, county, or zip code in various aspects. The link speed metric included in the indication 210a may characterize performance of a link connecting the endpoint to a next node in a network path between the endpoint and another endpoint for a digital connection, such as a VoIP session between the endpoint 104b and the endpoint 104a discussed above with respect to FIG. 1. For example, the link speed metric 1 may represent performance of the link 120d. In some aspects, the link speed metric 1 may be a static indication of link performance, such as an indication of a physical type of link, or maximum link capacity (such as 10 Gb/sec). In some aspects, the link speed metric 1 may represent a dynamic measurement of link capacity, such as a current throughput, latency, round trip time, jitter, or other measurement of the link's capacity. The endpoint 104b transmits the message 205a to the gateway 106c.

The gateway 106c may be configured to forward the message 205a along a network path towards a destination endpoint, such as endpoint 104a, discussed above with respect to FIG. 1. To that end, the gateway 106c may forward the message 205a to the session border controller 106b. As part of the processing that the gateway 106c performs on the message 205a, the gateway 106c may append additional path information to the path field 210a of message 205a to form an updated path field 210b. The modification may add an address of the gateway 106c to form the path field 210b. The modification may also add an indication of a geographic location of the gateway 106c to the path field 210b. The gateway 106c may also add additional link speed data to the path field 210b. For example, the additional link speed data, shown in FIG. 2 as "link speed metric 2" may characterize a network link in the direction of the endpoint 104a, such as link 120c shown in FIG. 1.

The link speed metrics discussed with respect to FIG. 2, may take similar or different forms to the link speed metric 1 discussed above with respect to path 210a. Thus, the path field 210b represents the original path field 210a received from the endpoint 104b, with additional address, location information, and link speed information for the gateway 106c appended to that received information to form the path field 210b.

When the SBC 106b receives the message 205b, it also appends its address information ("addr 3") location information ("location 3") and link speed information ("link speed metric 3") to form a new path field 210c. The SBC 106b then forwards the modified message 205 along to the endpoint 106a as message 205c. As discussed above, an RTCP session may be established between the SBC's 106b and 106a. Thus, FIG. 2 shows an RTCP message transmitted by the SBC 106b to the SBC 106a as message 220. The RTCP message 220 may include one or more performance indications of an RTP session between the SBC 106a and SBC 106b.

Upon receiving the message 205c, the SBC 106a may utilize the information in the path 210c to characterize the performance of a communication session established between the endpoint 104a of FIG. 1 and the endpoint 104b.

While FIG. 2 shows each of the endpoint 104b, gateway 106c, and SBC 106b appending location, address information, and link performance information to a message as it traverses a network path from the endpoint 104b towards the endpoint 104a, in some aspects, one or more of these network nodes may not append any information to the message 205 or only a portion of the information discussed with respect to FIG. 2 as it traverses the network path. Thus, the SBC 106a may in some aspects receive only a portion of the location information, address information and/or link performance information for a network path used for communication between the endpoints 104a and 104b.

Figure 3:
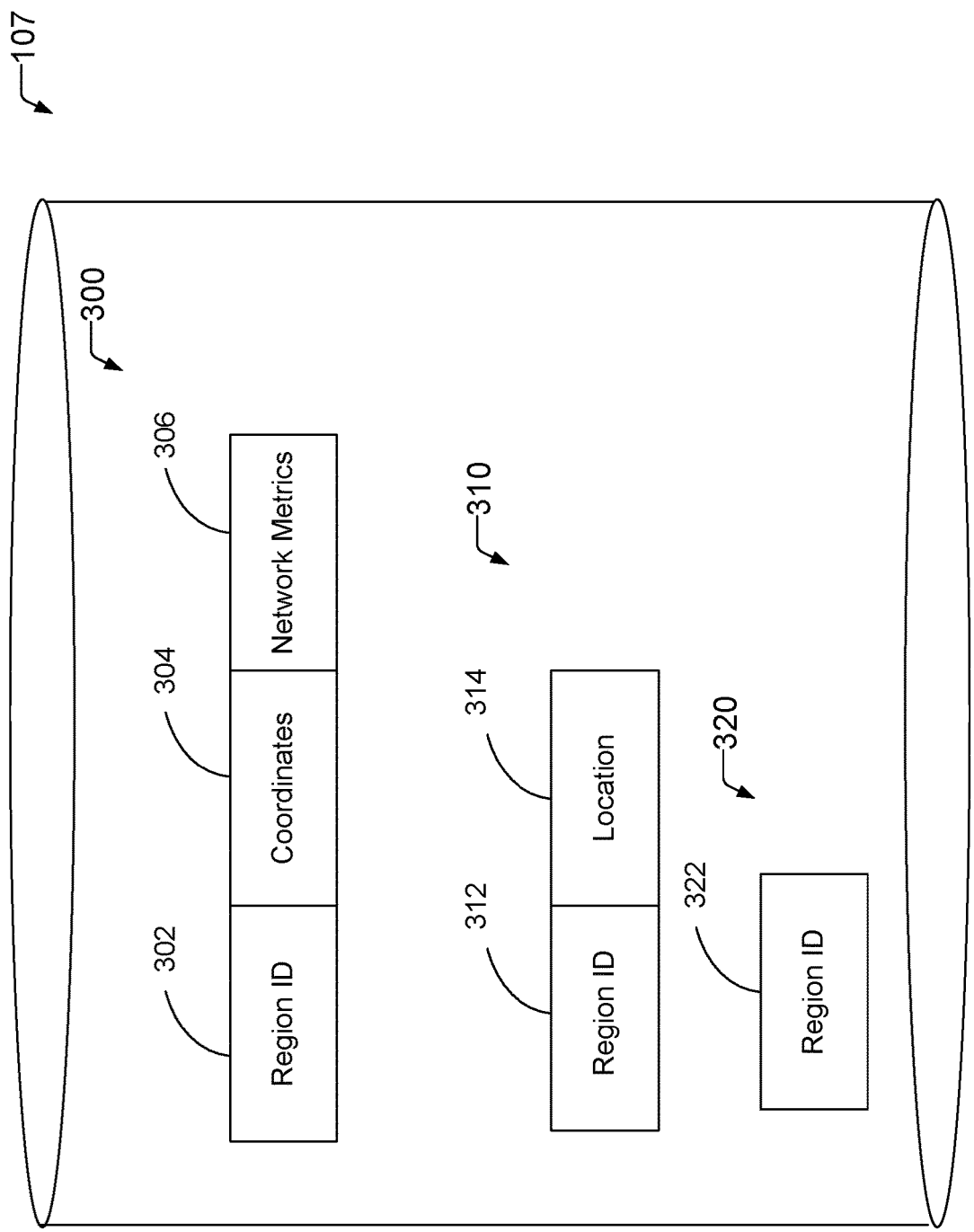
FIG. 3 is an example of a database design that may be implemented in at least some embodiments.

FIG. 3 is an example of a database design that may be implemented in at least some embodiments. FIG. 3 shows one design that may be implemented within the database 107, discussed above with respect to FIG. 1.

The database 107 includes a region table 300 and a location table 310. The region table 300 includes a region identifier 302, coordinates field 304, and a network metrics field 306. The region identifier 302 uniquely identifies a geographic region. The coordinates field 304 may describe the geographic region identified via the region identifier 302. In some aspects, the coordinates field 304 includes multiple coordinates defining one or more borders of the region identified by the region identifier 302. For example, if the region is substantially rectangular, the coordinates field 304 may include at least four coordinates indicating at least the four corners of the rectangular region. Less regular shaped regions may include more coordinates in the coordinates field 304. The network metrics field 306 may define one or more metrics measuring performance of a network within the region identified by the region identifier 302. For example, in some aspects, the one or more metrics may define a round trip time metric and/or a jitter metric for the region. In some aspects, the network metrics 306 may be periodically updated. For example, in some aspects, one or more network monitoring systems may be configured to monitor network performance within a region. The network monitoring system(s) may update the network metrics field 306 as appropriate to provide relatively current measurements of performance of the region identified by the region identifier 302. In some aspects, the network metrics 306 may represent typical network performance metrics but may not necessarily be "current," in that the metrics 306 may not be based on measured performance of the region 302 within a particular time period.

The table 310 includes a region identifier 312 and a location 314. The region identifier 312 may provide for cross referencing with the region identifier 302. Thus, the region identifier 312 and 302 may identify an equivalent region when their values are equivalent. The location 314 may be geographically within the region identified by the region identifier 312. The location table 310 provides for identifying which region a particular location is within. As discussed above, some aspects of this disclosure may provide for identifying locations of one or more nodes in a network path. These locations may be cross-referenced with the location table 310 to determine a region in which the network node lies. This information may then be used to characterize a performance that may be expected from a network path including the identified region.

Database 107 may also include a white list 320. The white list 320 identifies zero or more regions during which network routing changes may not be made by embodiments of this disclosure. The white list 320 may include a region identifier 322, which may be cross referenced with region identifiers 312 and/or 302. For example, some regions may be prone to relatively high levels of jitter, connectivity, or unreliability. In some aspects, these regions may experience relatively high variability in network performance. As such, it may not be desirable for the embodiments of this disclosure to adjust a network path including these locations, as it may be unlikely to result in improved network performance. In some cases, these networks may benefit from network route stability when compared to network paths that are frequently modified in efforts to improve performance.

Figure 4:
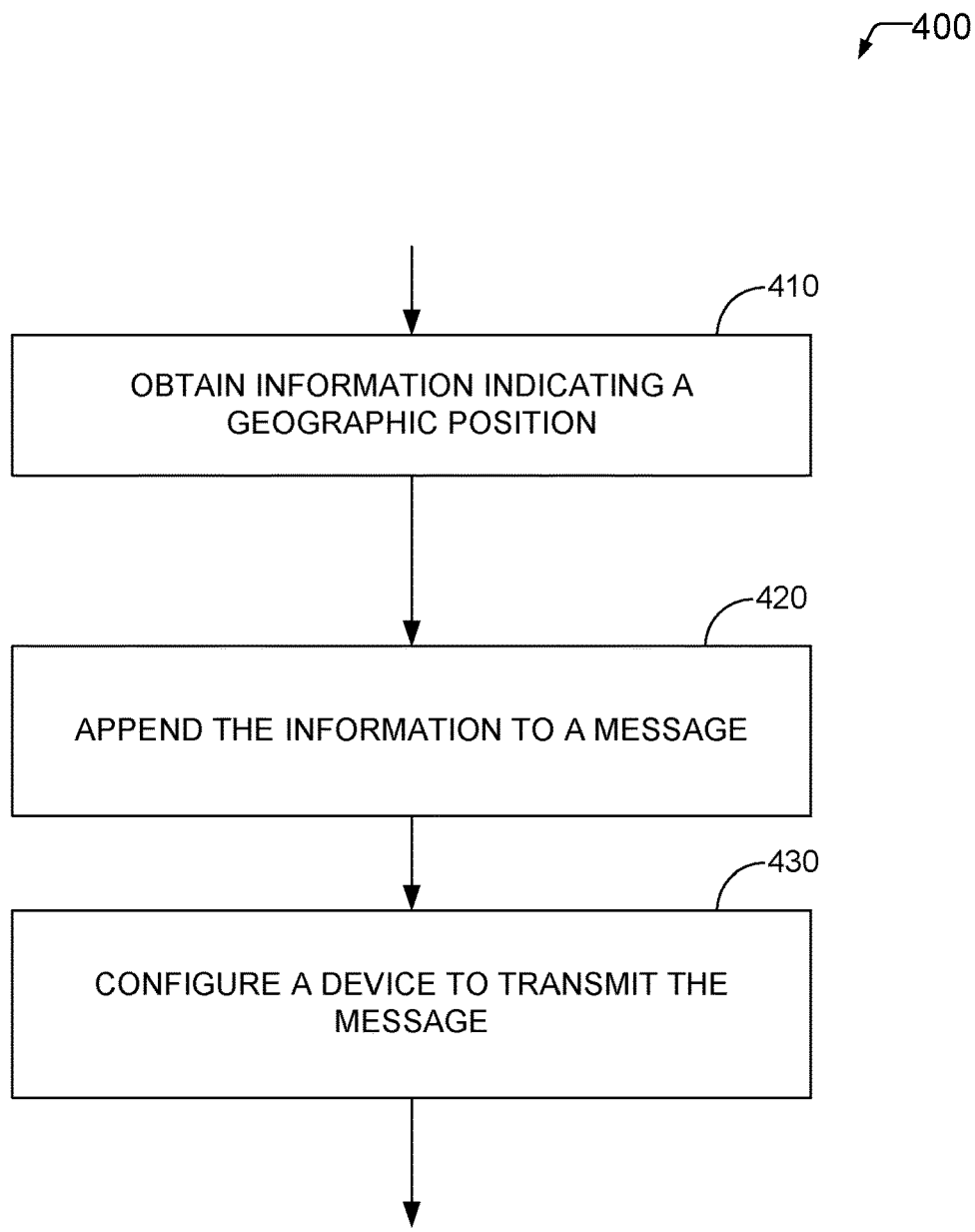
FIG. 4 is a flowchart of an example method for including network path information in a message.

FIG. 4 is a flowchart of an example method for including network path information in a message. In some aspects, one or more of the functions discussed below with respect to FIG. 4 may be performed by hardware processing circuitry. For example, instructions stored in an electronic memory may configure the hardware processing circuitry to perform one or more of the functions discussed below with respect to process 400 and FIG. 4.

In operation 410, information indicating a geographic position is obtained. In some aspects, the information may be obtained from a location server or location database that stores a mapping of device identifier and device location. In some aspects, a device identifier for a device performing process 400 may be used to obtain a location of the device. In some other aspects, the information may be obtained from a global positioning receiver, or other satellite based positioning system.

In operation 420, the location information is appended to a message. In some aspects, the message is a session initiation protocol (SIP) message. For example, as discussed above with respect to FIG. 2, in some aspects, a device may append information to a field in a message, such as the path field indicated in FIG. 2. In some aspects, the message is appended to a portion of a SIP header.

Some aspects of operation 420 may include appending additional information to the message. For example, in some aspects, address information for a device performing process 400 may be appended to the message. For example, one or more of an IP address, station address, or VoIP session identifier may be appended to the message in operation 420. In some aspects, operation 420 may include appending link performance information to the message. The link performance information may characterize performance of a link between the device performing process 400 and a next device in a network path towards a destination endpoint. For example, the link performance information may indicate one or more of round trip time, latency, throughput, jitter or any other indication of network performance of the link between the device executing process 400 and the next network device in the network path.

In operation 430, a device is configured to transmit the message. In some aspects, the device may be a network gateway, such as the gateway 106c, or a session border controller, such as any of the session border controllers 106a or 106b discussed above with respect to FIG. 1. In some aspects, the device may be an endpoint, such as the endpoint 104b. Configuring the device to transmit the message may include notifying a transmitter, such as a transceiver chip or dedicated hardware transmitter, of a location of the message in a memory, and an indication that the message is ready for transmission. In some aspects, operation 430 includes actual transmission of the message.

Figure 5:
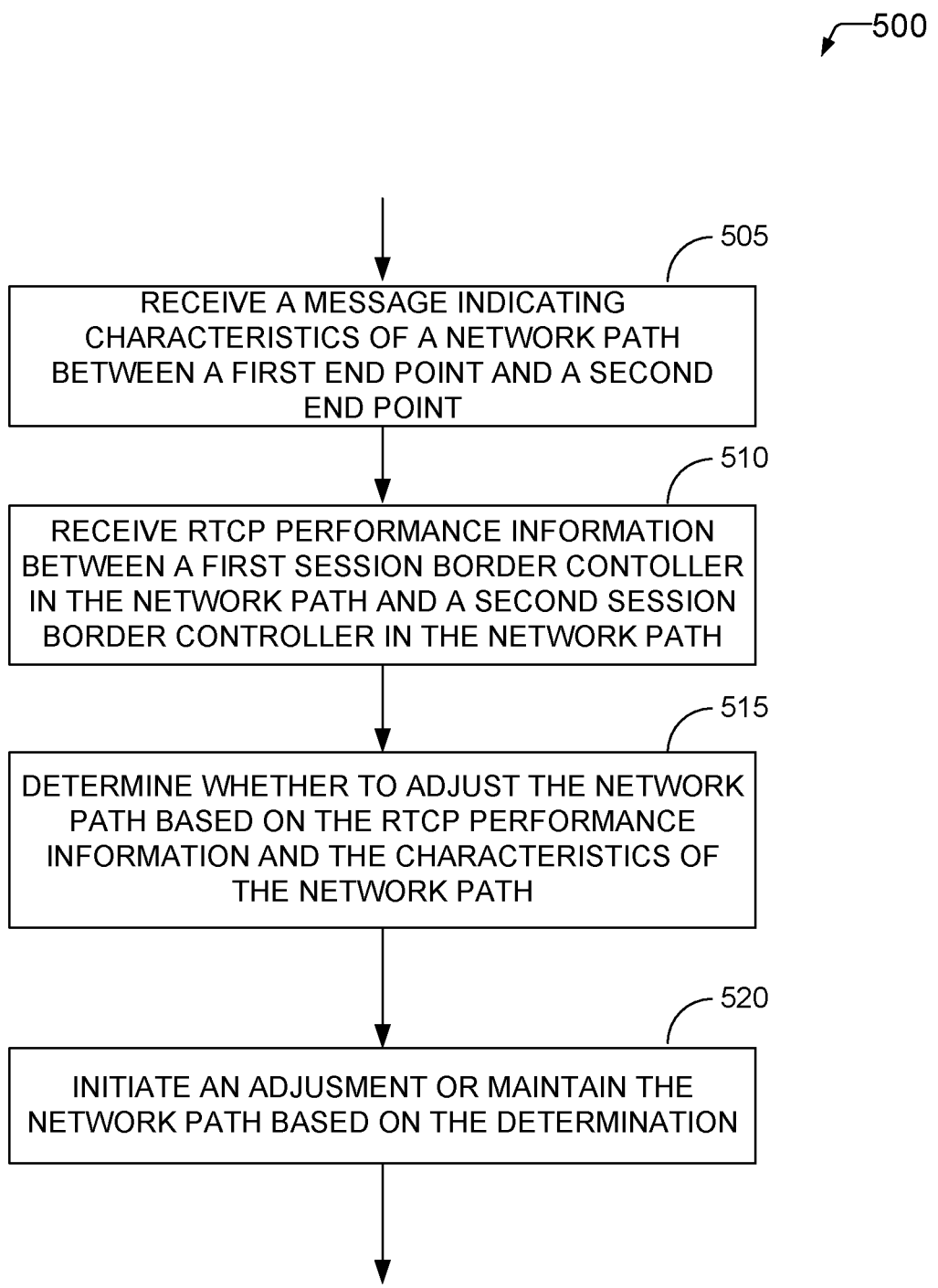
FIG. 5 is a flowchart of an example method for determining whether to adjust or maintain a network path for a network session.

FIG. 5 is a flowchart of an example method for determining whether to adjust or maintain a network path for a network session. In some aspects, one or more of the functions discussed below with respect to FIG. 5 may be performed by hardware processing circuitry. For example, instructions stored in an electronic memory may configure the hardware processing circuitry to perform one or more of the functions discussed below with respect to process 500 and FIG. 5.

In operation 505, a message is received indicating one or more characteristics of a network path between a first end point and a second endpoint. The message may be a data message supporting a network session, such as a VoIP session, between the first end point and the second end point in some aspects. The characteristics may indicate one or more locations of network nodes on the network path, address information for one or more of the nodes, and link performance information for one or more nodes along the network path. For example, as discussed above with respect to FIG. 2, in some aspects, as a data message for a session moves along a network path, network nodes on the network path may insert information into the message. A node may insert its location, its address, and/or local performance information, such as link performance information along a link used as part of the network path. Operation 505 may receive such a message. An algorithm for receiving the message of block 505 may include at least notifying a receive subsystem of a device executing process 500 that block 505 is ready to receive the message. This may include allocating memory for the message and passing a pointer to the allocated memory to the receive subsystem. Once the message has been received, one or more indications may be decoded from the message. For example, the received message may be parsed according to a format of the message to identify locations within the message where the one or more indications are encoded.

In operation 510, RTCP performance information is received from a session border controller within the network path. As discussed above with respect to FIG. 1 and FIG. 2, a session border controller (e.g., 106a) may receive RTCP information from a second session border controller (e.g., 106b). The RTCP information may include round trip time (RTT) information, jitter information, or other performance characterizations for a portion of the network path between the two session border controllers. Because this information represents performance on only a portion of a total network path, it may not completely characterize a performance experienced by the end user. The RTCP performance information may be received by at least receiving a RTCP message from a network, and parsing the received message according to a message format defined by the RTCP protocol standard. This may allow identification of one or more values of performance metrics encoded within the RTCP message.

Operation 515 may determine whether to adjust the network path based at least in part on the location information and the RTCP performance information. For example, in some aspects, operation 515 may determine whether any locations indicated in the message received in operation 505 are indicated in the white list of database table 320. In some aspects, operation 515 may accomplish this by first matching a location specified in the message to a region via the table 310. Operation 515 may then determine whether the region is identified in the white list 320. If the region is identified in the white list, no adjustment may be made to the network path. Instead, any changes to the network path may be accomplished when a higher level network session is ended, perhaps due to lack of connectivity between two endpoints. Alternatively, an amount of time a performance of the network session may remain below a nominal performance level (i.e. performance meeting one or more criterion) may vary based on whether one or more regions through which a network path for the session passes, as discussed above.

In some aspects, a report may be generated based on the performance indication and the location. In some aspects, the report may be displayed on an electronic display or printed to hardcopy. In some aspects, the report may be generated listing any network sessions with performance measurements meeting one or more criterion. In some aspects, these criterion may identify network sessions with performance below a nominal performance level. The report may also list, along with the performance measurements for a session, one or more locations of nodes in a network path supporting the session. In some aspects, a status indicator may also be displayed for each session in the report. The status indicator may indicate results of operation 515.

In some aspects, if the region is identified on the white list, a first timer value may be assigned to the network session. For example, for network sessions traversing particular regions, a longer period of below nominal performance may be tolerated by some embodiments of this disclosure before an adjustment to a network path for the session is initiated. When the timer expires, if the performance remains below nominal, then a change in the network path may be initiated. Network paths traversing one or more regions on the white list (or more than a threshold number of regions) may be assigned timer values higher than network paths that do not traverse any or fewer than the threshold value regions on the white list.

Otherwise, if the region is not identified on the white list, then operation 515 may determine whether to adjust the network path based on whether the RTCP performance information indicates performance is below a threshold. For example, if a round trip time indicated by the RTCP information is larger than a defined threshold, operation 515 may determine the network session between the two end points should be adjusted. In some aspects, as discussed above, block 515 may determine whether performance of the network session has been below a nominal performance level for more than a threshold period of time, where the threshold is based on whether the network path for the session traverses a second threshold number of regions on the white list. If the performance level has been below nominal (meets a defined criterion) for the assigned threshold time period, then block 515 may determine to adjust the network path, assuming alternate network paths are available.

In operation 520, an adjustment to the network path may be initiated based on the determination made in operation 515. For example, if an adjustment is to be made, the session border controller 106a may utilize a different destination address for the network session. The different destination address may cause a change in the route used for the network session. For example, in some aspects, a different destination address may cause a session between end points 104a and 104c to use link 120e instead of link 120d. Thus, initiating an adjustment to the network path may include at least determining a different destination address to accomplish the adjustment, and then utilizing the different destination address for communication with the remote endpoint so as to affect the adjustment. In other aspects, a signal may be provided to a routing device, such as a multiplexer to change the network path.

Figure 6:
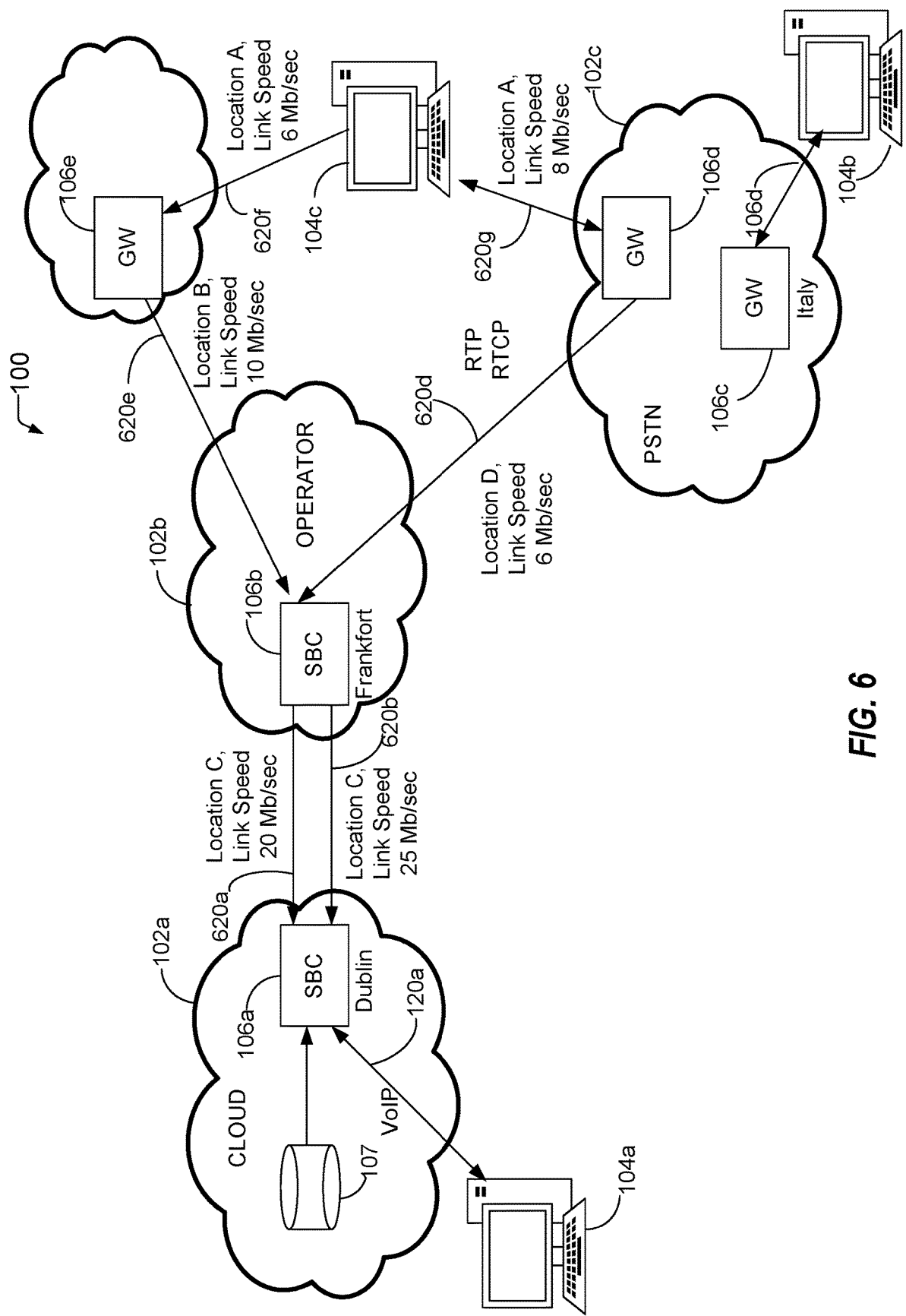
FIG. 6 shows another view of the communication network discussed above with respect to FIG. 1.

FIG. 6 shows another view of the communication network 100 discussed above with respect to FIG. 1. As shown in FIG. 1, the communication network shows endpoints 104a, 104b, and 104c. Also shown in FIG. 6 are session border controllers 106a and 106b, as well as gateways 106c, 06d and 106e. FIG. 6 illustrates an example of how network path information between the endpoints 104a and 104c may be passed along as data travels from the endpoint 104c to the endpoint 104a. In some aspects, the data may be passed in a manner similar to that illustrated in FIG. 2, where one or more nodes in the network path (such as any of SBCs 106a or 106b, and/or gateways 106c-e.

FIG. 6 shows messages 620f, 620e, and 620a transmitted along one network path between endpoints 104a and 104c. The messages 620f, 620e, and 620e may be analogous to the messages 205a, 205b, and 205c discussed above with respect to FIG. 2. FIG. 6 also shows messages 620g, 620d, and 620b, propagating along a second network path between the endpoint 104c to the endpoint 104a. FIG. 6 shows each message 620 shown in FIG. 6 may include network path information from a network node transmitting the message. The message may include at least location information and/or link performance information as discussed above with respect to FIG. 2. For example, the message 620f indicates it is transmitted from location A over a link with a speed of 6 Mb/sec. Message 620g is also transmitted from location A over a link (120g) with a link speed of 8 Mb/sec. The indicated link speed may be a measured speed or a maximum speed based on the hardware technology used for the link.

The message 620e indicates it is transmitted from location E over a link having a speed of 10 Mb/sec. Message 620e may also include the path information discussed above with respect to message 620f, similar to the discussion of FIG. 2 where network path information is appended as a message moves along a network path. The message 620a indicates it is transmitted from a location C (the location of the SBC 106b) over a link having a speed of 20 Mb/sec. Message 620a may include the path information discussed above with respect to messages 620e and/or message 620f.

Message 620d shows it is transmitted from location D (a location of the gateway 106d) over a link having a speed of 6 Mb/sec (link 120d from FIG. 1). This path also includes message 620b, transmitted from location C over a link having a speed of 25 Mb/sec. Note that while messages 620a and 620b are both transmitted over link 120a (from FIG. 1), they report differing link speeds. This may be a result of variability of a capacity of the link 120a over time, with the two messages 620a and 620b transmitted at different times and thus experiencing different link speeds over link 120a. Some embodiments of this disclosure may use the network path information illustrated in FIG. 6 to adjust a performance metric characterizing at least a portion of a network path between two endpoints. In some aspects, decisions as to whether to adjust the network path may be made on the network path information, as discussed further below.

Figure 7:
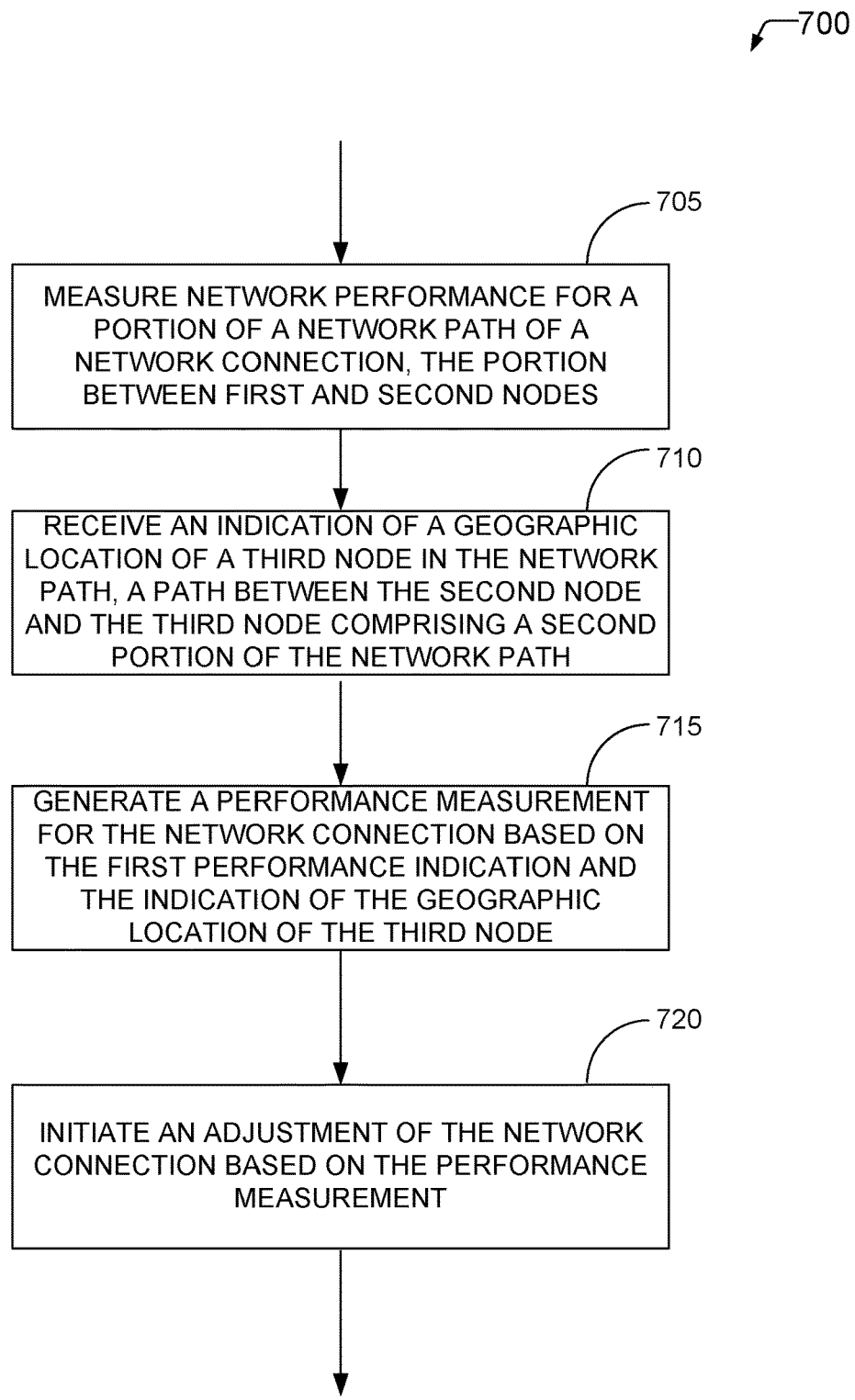
FIG. 7 is a flowchart of a method for determining end to end performance for a network connection.

FIG. 7 is a flowchart of a method for determining end to end performance for a network connection. In some aspects, one or more of the functions discussed below with respect to process 700 and FIG. 7 may be performed by one or more of the SBCs 106a or 106b, or the gateways 106c or 106d. For example, hardware processing circuitry in one or more of these devices may be configured by instructions stored in a memory to perform the one or more functions discussed below with respect to process 700 and FIG. 7.

In operation 705, performance of a portion of a network path between a first and second endpoint is measured. The portion of the network path may be between a first and a second node within the network path One of either the first or second nodes may be an endpoint, but both are not endpoints for the purpose of the discussion of operation 705. There may be a network session or connection established between the first and second endpoints. In some aspects, the two nodes may measure performance within their respective portion of the network path (between the two nodes). For example, the two nodes may employ real-time transmission control protocol (RTCP) in some aspects to measure network performance in terms of round trip time, jitter, or other measurements. For example, the portion of the network path referred to with respect to operation 705 may be the portion between SBC 106a and 106b illustrated in FIG. 1 as link 106a.

In operation 710, an indication of a geographic location of a third node in the network path may be received. For example, in some aspects, the third node may be a network device beyond the SBC 106b in the network path starting at endpoint 104a and terminating at endpoint 104b. For example, the third node may be any one of gateways 106c or 106d, or the endpoint itself, such as endpoint 104b.

In some aspects, the indication of the geographic location may be in the form of geographic coordinates indicating the location. Alternatively, the indication may take the form of a city name, county or country name, or any other form that may identify a geographic region or point on the earth. In some aspects, the indication may be received in a VoIP message, such as a session initiation protocol (SIP) message. In some aspects, the indication may be included in a header of the message.

In some aspects, the indication may be received in a form similar to or substantially equivalent to the network path example discussed above with respect to FIG. 2. For example, the location indication may be added by the third node itself as a message (which may be part of a network session between the first and second endpoints) propagates through the network path from one endpoint to another (such as from the endpoint 104b towards the endpoint 104a, or vis-versa).

In some aspects, additional indications may be received. For example, as illustrated in FIG. 2, in some aspects, an indication of an address of the third node may also be received. In some aspects, an indication of a link speed or link performance of a second portion of the network path may be received. For example, the indication of link performance may represent performance of a link between the third node and another node in the network path "towards"

the first endpoint. For example, if SBV 106*a* is performing process 700, the third node may represent the gateway 106*c*, the received location information may represent a physical geographic location of the gateway 106*c*, and the link speed or performance indication may represent a measured performance of the link 120*c*. In some aspects, a type of link represented by the link performance measurement may also be received. For example, in the case of link 120*c*, the received indication may indicate the link is a PSTN link. In other environments, for example if the third node was gateway 106*e*, the link type may indicate the link 120*e* is a digital connection.

In operation 715, a performance measurement is generated based on the received indication of the geographic location of operation 710 and the performance measurement for the first portion determined in operation 705. For example, in some aspects, the performance measurement for the first portion may be prorated based on the received indication of the geographic location. Some aspects of operation 715 may be implemented by process 800, discussed below with respect to FIG. 8.

In operation 720, an adjustment of the network path is initiated based on the performance measurement determined in operation 715. For example, operation 720 may adjust the network path by sending control signals to one or more gateway or router devices to adjust the path. For example, the SBC 106*b* may be instructed to change a path to endpoint 104*c* (for example) from using link 120*d* and gateway 106*d* to link 120*e* and gateway 106*e*.

Figure 8:
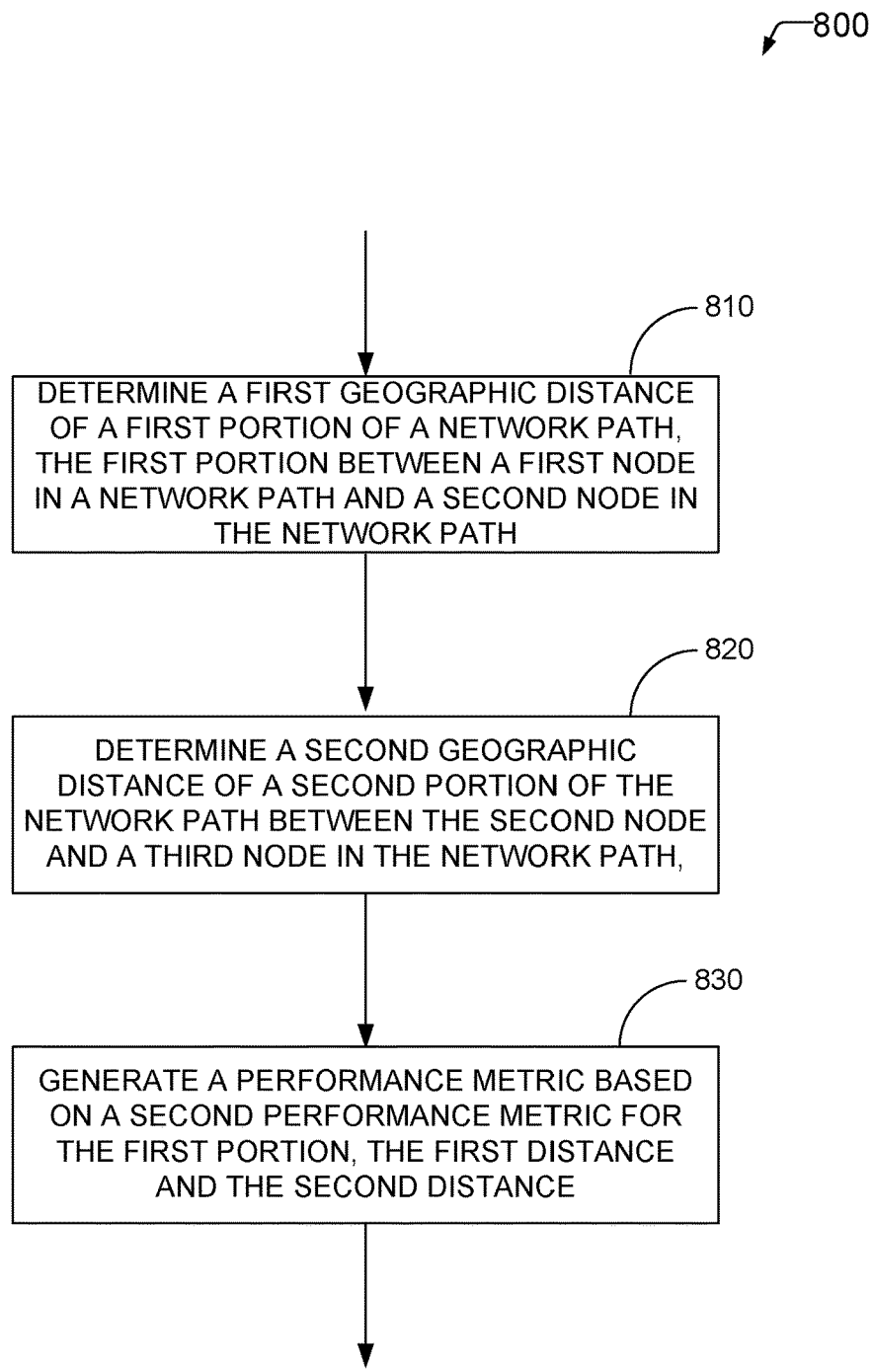
FIG. 8 is a flowchart of a method for determining end to end performance for a network connection.

FIG. 8 is a flowchart of a method for determining end to end performance for a network connection. In some aspects, one or more of the functions discussed below with respect to process 800 and FIG. 8 may be performed by one or more of the SBCs 106*a* or 106*b*, or the gateways 106*c* or 106*d*. For example, hardware processing circuitry in one or more of these devices may be configured by instructions stored in a memory to perform the one or more functions discussed below with respect to process 800 and FIG. 8. In some aspects, operation 715 of FIG. 7 may be implemented by process 800 of FIG. 8.

In operation 810, a first geographic distance of a first portion of a network path is determined. The network path may be a path between two endpoints of a network session or connection, such as a network path between two endpoints such as endpoints 104*a* and 104*b*, or 104*a* and 104*c* for example. The first portion may be for example, a portion of the network path between two network nodes (a first network node and a second network node). For example, the first portion of the network path may be between two session border controllers, such as SBCs 106*a* and 106*b*, represented in FIG. 1 as link 120*a*. The first geographic distance may be determined, at least in part, by two location indications representing locations of the two nodes (e.g., first and second network nodes) on each end of the first portion of the network path. For example, the two location indications may represent geographic locations of the two session border controllers 106*a* (first node) and 106*b* (second node) in some aspects. In some aspects, a method for determining the distance may include determining a great circle distance using a haversine formula.

At least one of the location indications may be received in a message, such as a SIP message. For example, as discussed above with respect to FIG. 2, a message (e.g. any of 205*a-c*) including network path information may be propagated along the network path, and may be received by a device performing process 800. For example, the SBC 106*a* may perform process 800 in some aspects, and may receive location information for the SBC 106*b* in a SIP message in some aspects. The SBC 106*b* may be considered the second node in the network path in these aspects. The location information for the SBC 106*b* may have been inserted into the SIP message by the SBC 106*b* itself as the SIP message made its way along the network path from SBC 106*b* to SBC 106*a*. If the device performing process 800 is the first node in the network path, the device performing process 800 may obtain its own location in a number of ways. For example, the device performing process 800 may be equipped with positioning equipment, such as a satellite based positioning receiver (e.g., GPS), or the location of the device performing process 800 may be manually configured. The first geographic distance may then be determined between the device performing process 800 (e.g., first node in some aspects) and the second node, based on the two location indications. In some aspects, the first node is not the device performing process 800, but another node in the network path. In some aspects, the first geographic distance may be determined by calculating a great circle distance using the haversine equation.

In operation 820, a second geographic distance of a second portion of the network path is determined. The second portion of the network path may be bounded on one end by one of the first nodes or second nodes discussed above, and may also be bounded on a second end by a third node included in the network path between the first and second endpoints. A location of the third node may be obtained in some aspects, from a received message. The message may be received, in some aspects, from the third node or a node between the second node and third node in some aspects. For example, as discussed above with respect to FIG. 2, a message propagating along a network path between the two endpoints may be appended with network path information as it moves along the network path. Thus, in this example, the third node may insert its location information into the network path information included in a message, such as a SIP message. The SIP message may be supporting a VoIP session between the two endpoints. For example, the SIP message may carry data supporting the VoIP session in some aspects. This message may then be received by an additional node, such as the first node, as the message moves along the network path towards an endpoint. In some aspects, the second geographic distance may be determined by calculating a great circle distance using the haversine equation.

In operation 830, a first performance measurement is generated based on the first geographic distance and the second geographic distance. The generated performance measurement is also generated based on a second performance measurement between the first node and the second node. For example, as discussed above, the session border controllers 106*a* and 106*b* may maintain an RTCP session to support performance assessment of a portion of the network path between the two SBCs. The RTCP session may provide round trip time measurements, jitter measurements, or other characterizations of the first portion of the network path. In some aspects, the first performance measurement is prorated based on the first distance and second distance. For example, in some aspects the first performance measurement may be determined based on the following equation:

$$1^{st}p = 2^{nd}p * \text{second geographic distance} / \text{first geographic distance} \quad (1)$$

where:
$1^{st}$ p is the first performance measurement and
$2^{nd}$ p is the second performance measurement.

Thus, in some aspects, an adjustment factor may be applied to the performance measurement for a first portion of a network path so as to "pro-rate" the performance measurement based on the geographic distance covered by the performance measurement and a second distance of the network path. Thus, for example, if a round trip time measurement derived from for example, half of a distance of a total network path between two endpoints may be doubled to represent a heuristic for a round trip time measurement for the total network path between the two endpoints.

In some aspects, the first performance measurement may be based on additional data. For example, in some aspects, process 800 may include receiving additional information on the network path between the two endpoints. For example, as discussed above with respect to FIG. 2, a message propagating along a network path between the two endpoints may be appended to include additional path information as it is transmitted. For example, one or more nodes in the network path may add link performance characterization information to the path information in the message. In some aspects, the link performance characterization may represent a physical characteristic of the link, for example, a type of network link, or a maximum physical capacity of the link (e.g., 10 Gb/s). Alternatively, the link performance characterization may be a measured performance capacity of the link. In some aspects, the measured performance capacity may be "current" in that it represents performance of the link within a time period that is within a predetermined elapsed time from a present or current time. Thus, in some aspects, the first performance measurement may be determined based on link performance information along the network path. For example, in some aspects, the round trip time may be adjusted based on the distances as discussed above and in addition based on a determined average link performance during the distance. Thus, for example, in some aspects, the second performance metric may be prorated based on distances, and also based on capacities of links within the network path. For example, in some aspects, the following equation may be used to determine an average link capacity across at least a portion of the network path:

$$\text{average capacity} = \frac{\text{performance 1} * \text{distance 1}}{\text{distance 1} + \text{distance 2}} + \frac{\text{performance 2} * \text{distance 2}}{\text{distance 1} + \text{distance 2}} \quad (2)$$

where:
performance 1 is a link performance metric (e.g. capacity) over a first portion of a network path having a first distance (distance 1)
performance 2 is a link performance metric (e.g., capacity) over a second portion of the network path having a second distance
average capacity is the average link performance over the total distance of first and second distance.

Once the average capacity may be understood, the first performance metric may be adjusted based on the average capacity, for example, as below in equation 3:

$$\text{adjusted } 1^{st} p = 1^{st} p * \frac{\text{performance 1}}{\text{average capacity}}$$

where:
$1^{st}$ p is the first performance metric discussed above, which may have been adjusted based on distance as discussed above
performance 1 is a link performance metric (e.g capacity) over the first portion of the network path.
average capacity is an average capacity over a total portion of a network path being characterized by the resulting adjusted first performance metric.

In aspects where process 800 implements operation 715 of FIG. 7, the adjusted first performance metric or the first performance metric may represent the "performance measurement" of operation 715.

Figure 9:
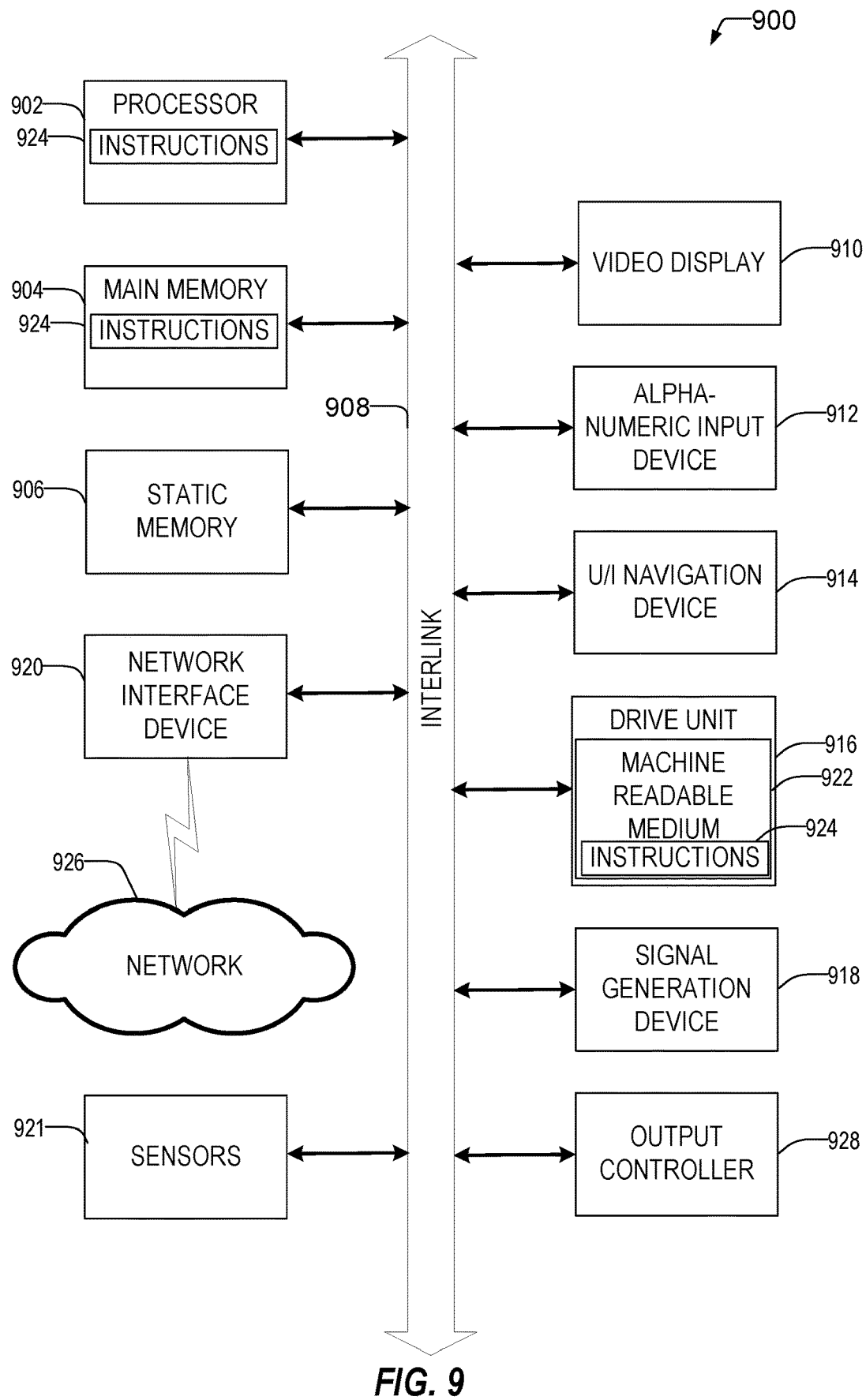
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Machine 900 may implement, in whole or in part, the any one of the session border controllers 106a or 106b, and/or gateways 106c-e. In various embodiments, machine 900 may perform one or more of the processes described above with respect to FIGS. 4-5 and/or 7-8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is an apparatus for measuring performance of a network connection, the apparatus comprising: hardware processing circuitry; hardware memory storing instructions that when executed configure the hardware processing circuitry to perform operations comprising: receiving a performance indication for a first portion of a network path for a network connection, the first portion between a first node and a second node in the network path; receiving an indication of a geographic location of a third node in the network path, the indication included in a message from the second node, a path between the second node and the third node comprising a second portion of the network path, the second portion not including the first portion; generating a performance measurement for the network connection based on the performance indication and the indication of the geographic location of the third node; and initiating an adjustment of the network connection based on the performance measurement.

In Example 2, the subject matter of Example 1 optionally includes the operations further comprising searching a white list for the indicated geographic location, and refraining from adjusting the network connection in response to finding the indicated geographic location on the white list.

In Example 3, the subject matter of any one or more of Examples 1-2 optionally include the operations further comprising: receiving an indication of a second geographic location of the second node, and mapping the second geographic location of the second node and the geographic location of the third node to an adjustment factor for the performance indication, and generating the performance measurement based on the performance indication and the adjustment factor.

In Example 4, the subject matter of Example 3 optionally includes the operations further comprising determining a distance between the second geographic location of the second node and the geographic location of the third node, and determining the adjustment factor based on the distance.

In Example 5, the subject matter of any one or more of Examples 3-4 optionally include the operations further comprising receiving an indication of a link speed of the second portion of the network path, and determining the adjustment factor based on the link speed.

In Example 6, the subject matter of any one or more of Examples 1-5 optionally include wherein the indication of the geographic location of the third node is received in a session initiation protocol (SIP) message.

In Example 7, the subject matter of Example 6 optionally includes the operations further comprising receiving a second indication of a second round trip time measurement between the second node and the third node, and wherein the generating of the performance measurement is further based on the second indication.

In Example 8, the subject matter of Example 7 optionally includes wherein the second round trip time measurement is received by the second node in a RTCP message from the third node.

In Example 9, the subject matter of any one or more of Examples 1-8 optionally include wherein the network connection comprises a voice over Internet Protocol (VoIP) connection, the first node is a first session border controller (SBC) for the VoIP connection and the second node is a second SBC for the VoIP connection.

In Example 10, the subject matter of Example 9 optionally includes wherein the network connection comprises at least two real-time-protocol sessions.

In Example 11, the subject matter of any one or more of Examples 9-10 optionally include wherein the network connection comprises at least one real-time transport protocol session and a Public Switched Telephone Network connection.

In Example 12, the subject matter of any one or more of Examples 1-11 optionally include wherein initiating an adjustment of the network connection comprises changing the network path based on the performance measurement.

In Example 13, the subject matter of any one or more of Examples 1-12 optionally include wherein initiating an adjustment of the network connection comprises changing an amount of error coding performed for the network connection based on the performance measurement.

In Example 14, the subject matter of any one or more of Examples 1-13 optionally include wherein initiating an adjustment of the network connection comprises changing a quantization rate of the network connection based on the performance measurement.

Example 15 is an apparatus for measuring performance of a network connection, the apparatus comprising: means for receiving a performance indication for a first portion of a network path for a network connection, the first portion between a first node and a second node in the network path; means for receiving an indication of a geographic location of a third node in the network path, the indication included in a message from the second node, a path between the second node and the third node comprising a second portion of the network path, the second portion not including the first portion; means for generating a performance measurement for the network connection based on the performance indication and the indication of the geographic location of the third node; and means for initiating an adjustment of the network connection based on the performance measurement.

In Example 16, the subject matter of Example 15 optionally includes means for searching a white list for the indicated geographic location, and refraining from adjusting the network connection in response to finding the indicated geographic location on the white list.

In Example 17, the subject matter of any one or more of Examples 15-16 optionally include means for receiving an indication of a second geographic location of the second node, and means for mapping the second geographic location of the second node and the geographic location of the third node to an adjustment factor for the performance indication, and generating the performance measurement based on the performance indication and the adjustment factor.

In Example 18, the subject matter of Example 17 optionally includes means for determining a distance between the second geographic location of the second node and the geographic location of the third node, and means for determining the adjustment factor based on the distance.

In Example 19, the subject matter of Example 18 optionally includes means for receiving an indication of a link speed of the second portion of the network path, and means for determining the adjustment factor based on the link speed.

In Example 20, the subject matter of any one or more of Examples 15-19 optionally include wherein the indication of the geographic location of the third node is received in a session initiation protocol (SIP) message.

In Example 21, the subject matter of any one or more of Examples 15-20 optionally include wherein the performance indication comprises a round trip time measurement received in a real-time transport protocol (RTP) control protocol (RTCP) message.

In Example 22, the subject matter of Example 21 optionally includes means for receiving a second indication of a second round trip time measurement between the second node and the third node, and wherein the means for generating of the performance measurement is configured to generate the performance measurement based on the second indication.

In Example 23, the subject matter of Example 22 optionally includes wherein the second round trip time measurement is received by the second node in a RTCP message from the third node.

In Example 24, the subject matter of any one or more of Examples 15-23 optionally include wherein the network connection comprises a voice over Internet Protocol (VoIP) connection, the first node is a first session border controller (SBC) for the VoIP connection and the second node is a second SBC for the VoIP connection.

In Example 25, the subject matter of Example 24 optionally includes wherein the network connection comprises at least two real-time-protocol sessions.

In Example 26, the subject matter of any one or more of Examples 24-25 optionally include wherein the network connection comprises at least one real-time transport protocol session and a Public Switched Telephone Network connection.

In Example 27, the subject matter of any one or more of Examples 15-26 optionally include wherein the means for initiating an adjustment of the network connection is configured to change the network path based on the performance measurement.

In Example 28, the subject matter of any one or more of Examples 15-27 optionally include wherein the means for initiating an adjustment of the network connection is configured to change an amount of error coding performed for the network connection based on the performance measurement.

In Example 29, the subject matter of any one or more of Examples 15-28 optionally include wherein the means for initiating an adjustment of the network connection is configured to change a quantization rate of the network connection based on the performance measurement.

Example 30 is a method of measuring performance of a network connection, comprising: receiving a performance indication for a first portion of a network path for a network connection, the first portion between a first node and a second node in the network path; receiving an indication of a geographic location of a third node in the network path, the indication included in a message from the second node, a path between the second node and the third node comprising a second portion of the network path, the second portion not including the first portion; generating a performance measurement for the network connection based on the performance indication and the indication of the geographic location of the third node; and initiating an adjustment of the network connection based on the performance measurement.

In Example 31, the subject matter of Example 30 optionally includes searching a white list for the indicated geographic location, and refraining from adjusting the network connection in response to finding the indicated geographic location on the white list.

In Example 32, the subject matter of any one or more of Examples 30-31 optionally include receiving an indication of a second geographic location of the second node, and mapping the second geographic location of the second node and the geographic location of the third node to an adjustment factor for the performance indication, and generating the performance measurement based on the performance indication and the adjustment factor.

In Example 33, the subject matter of Example 32 optionally includes determining a distance between the second geographic location of the second node and the geographic location of the third node, and determining the adjustment factor based on the distance.

In Example 34, the subject matter of Example 33 optionally includes receiving an indication of a link speed of the second portion of the network path, and determining the adjustment factor based on the link speed.

In Example 35, the subject matter of any one or more of Examples 30-34 optionally include wherein the indication of the geographic location of the third node is received in a session initiation protocol (SIP) message.

In Example 36, the subject matter of any one or more of Examples 30-35 optionally include wherein the performance indication comprises a round trip time measurement received in a real-time transport protocol (RTP) control protocol (RTCP) message.

In Example 37, the subject matter of Example 36 optionally includes receiving a second indication of a second round trip time measurement between the second node and the third node, and wherein the generating of the performance measurement is further based on the second indication.

In Example 38, the subject matter of Example 37 optionally includes wherein the second round trip time measurement is received by the second node in a RTCP message from the third node.

In Example 39, the subject matter of any one or more of Examples 30-38 optionally include wherein the network connection comprises a voice over Internet Protocol (VoIP) connection, the first node is a first session border controller (SBC) for the VoIP connection and the second node is a second SBC for the VoIP connection.

In Example 40, the subject matter of Example 39 optionally includes wherein the network connection comprises at least two real-time-protocol sessions.

In Example 41, the subject matter of any one or more of Examples 39-40 optionally include wherein the network connection comprises at least one real-time transport protocol session and a Public Switched Telephone Network connection.

In Example 42, the subject matter of any one or more of Examples 30-41 optionally include wherein initiating an adjustment of the network connection comprises changing the network path based on the performance measurement.

In Example 43, the subject matter of any one or more of Examples 30-42 optionally include wherein initiating an adjustment of the network connection comprises changing an amount of error coding performed for the network connection based on the performance measurement.

In Example 44, the subject matter of any one or more of Examples 30-43 optionally include wherein initiating an adjustment of the network connection comprises changing a quantization rate of the network connection based on the performance measurement.

Example 45 is a non-transitory computer readable storage medium comprising instructions that when executed configure hardware processing circuitry to perform operations for measuring performance of a network connection, the operations comprising: receiving a performance indication for a first portion of a network path for a network connection, the first portion between a first node and a second node in the network path; receiving an indication of a geographic location of a third node in the network path, the indication included in a message from the second node, a path between the second node and the third node comprising a second portion of the network path, the second portion not including the first portion; generating a performance measurement for the network connection based on the performance indication and the indication of the geographic location of the third node; and initiating an adjustment of the network connection based on the performance measurement.

In Example 46, the subject matter of Example 45 optionally includes the operations further comprising searching a white list for the indicated geographic location, and refraining from adjusting the network connection in response to finding the indicated geographic location on the white list.

In Example 47, the subject matter of any one or more of Examples 45-46 optionally include the operations further comprising: receiving an indication of a second geographic location of the second node, and mapping the second geographic location of the second node and the geographic location of the third node to an adjustment factor for the performance indication, and generating the performance measurement based on the performance indication and the adjustment factor.

In Example 48, the subject matter of Example 47 optionally includes the operations further comprising determining a distance between the second geographic location of the second node and the geographic location of the third node, and determining the adjustment factor based on the distance.

In Example 49, the subject matter of Example 48 optionally includes the operations further comprising receiving an indication of a link speed of the second portion of the network path, and determining the adjustment factor based on the link speed.

In Example 50, the subject matter of any one or more of Examples 45-49 optionally include wherein the indication of the geographic location of the third node is received in a session initiation protocol (SIP) message.

In Example 51, the subject matter of any one or more of Examples 45-50 optionally include wherein the performance indication comprises a round trip time measurement received in a real-time transport protocol (RTP) control protocol (RTCP) message.

In Example 52, the subject matter of Example 51 optionally includes the operations further comprising receiving a second indication of a second round trip time measurement between the second node and the third node, and wherein the generating of the performance measurement is further based on the second indication.

In Example 53, the subject matter of Example 52 optionally includes wherein the second round trip time measurement is received by the second node in a RTCP message from the third node.

In Example 54, the subject matter of any one or more of Examples 45-53 optionally include wherein the network connection comprises a voice over Internet Protocol (VoIP) connection, the first node is a first session border controller (SBC) for the VoIP connection and the second node is a second SBC for the VoIP connection.

In Example 55, the subject matter of Example 54 optionally includes wherein the network connection comprises at least two real-time-protocol sessions.

In Example 56, the subject matter of any one or more of Examples 54-55 optionally include wherein the network connection comprises at least one real-time transport protocol session and a Public Switched Telephone Network connection.

In Example 57, the subject matter of any one or more of Examples 45-56 optionally include wherein initiating an adjustment of the network connection comprises changing the network path based on the performance measurement.

In Example 58, the subject matter of any one or more of Examples 45-57 optionally include wherein initiating an adjustment of the network connection comprises changing an amount of error coding performed for the network connection based on the performance measurement.

In Example 59, the subject matter of any one or more of Examples 45-58 optionally include wherein initiating an adjustment of the network connection comprises changing a quantization rate of the network connection based on the performance measurement.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. An apparatus for measuring performance of a network connection, the apparatus comprising:
   hardware processing circuitry;
   hardware memory storing instructions that when executed configure the hardware processing circuitry to perform operations comprising:
      receiving a performance indication for a first portion of a network path of a network connection, the first portion between a first node and a second node in the network path;
      receiving an indication of a geographic location of a third node in the network path, the indication included in a message from the second node, a path between the second node and the third node comprising a second portion of the network path, the second portion not including the first portion;
      determining an adjustment to the network path of the network connection is necessary based on the performance indication; and
      inhibiting the determined adjustment of the network path of the network connection based on the indicated geographic location.

2. The apparatus of claim 1, the operations further comprising:
   receiving an indication of a second geographic location of the second node, and
   mapping the second geographic location of the second node and the geographic location of the third node to an adjustment factor for the performance indication, and wherein the generating of the performance measurement is further based on the performance indication and the adjustment factor.

3. The apparatus of claim 2, the operations further comprising determining a distance between the second geographic location of the second node and the geographic location of the third node, and determining the adjustment factor based on the distance.

4. The apparatus of claim 2, the operations further comprising receiving an indication of a link speed of the second portion of the network path, and determining the adjustment factor based on the link speed.

5. The apparatus of claim 1, wherein the indication of the geographic location of the third node is received in a session initiation protocol (SIP) message.

6. The apparatus of claim 5, the operations further comprising receiving a second indication of a second round trip time measurement between the second node and the third node, and wherein the generating of the performance measurement is further based on the second indication.

7. The apparatus of claim 6, wherein the second round trip time measurement is received by the second node in a real-time control transport protocol (RTCP) message from the third node.

8. The apparatus of claim 1, wherein the network connection comprises a voice over Internet Protocol (VoIP) connection, the first node is a first session border controller (SBC) for the VoIP connection and the second node is a second SBC for the VoIP connection.

9. The apparatus of claim 1, wherein initiating an adjustment of the network connection comprises changing an amount of error coding performed for the network connection based on the performance measurement.

10. The apparatus of claim 1, wherein initiating an adjustment of the network connection comprises changing a quantization rate of the network connection based on the performance measurement.

11. A method of measuring performance of a network connection, comprising:
receiving a performance indication for a first portion of a network path for a network connection, the first portion between a first node and a second node in the network path;
receiving an indication of a geographic location of a third node in the network path, the indication included in a message from the second node, a path between the second node and the third node comprising a second portion of the network path, the second portion not including the first portion;
determining an adjustment to the network path of the network connection is necessary based on the performance indication; and
inhibiting the determined adjustment of the network path of the network connection based on the indicated geographic location.

12. The method of claim 11, further comprising:
receiving an indication of a second geographic location of the second node, and
mapping the second geographic location of the second node and the geographic location of the third node to an adjustment factor for the performance indication, and wherein the generating of the performance measurement is further based on the adjustment factor.

13. The method of claim 12, further comprising determining a distance between the second geographic location of the second node and the geographic location of the third node, and determining the adjustment factor based on the distance.

14. The method of claim 12, further comprising receiving an indication of a link speed of the second portion of the network path, and determining the adjustment factor based on the link speed.

15. An apparatus for measuring performance of a network connection, the apparatus comprising:
means for receiving a performance indication for a first portion of a network path for a network connection, the first portion between a first node and a second node in the network path;
means for receiving an indication of a geographic location of a third node in the network path, the indication included in a message from the second node, a path between the second node and the third node comprising a second portion of the network path, the second portion not including the first portion;
means for determining an adjustment to the network path of the network connection is necessary based on the performance indication; and
means for inhibiting the determined adjustment of the network path of the network connection based on the indicated geographic location.

16. The apparatus of claim 15, further comprising:
means for receiving an indication of a second geographic location of the second node, and
means for mapping the second geographic location of the second node and the geographic location of the third node to an adjustment factor for the performance indication, and wherein the means for generating the performance measurement is configured to further based the performance measurement on the adjustment factor.

17. The apparatus of claim 16, further comprising means for determining a distance between the second geographic location of the second node and the geographic location of the third node, and means for determining the adjustment factor based on the distance.

* * * * *